US011061551B1

(12) United States Patent
Gill et al.

(10) Patent No.: US 11,061,551 B1
(45) Date of Patent: Jul. 13, 2021

(54) TECHNIQUES FOR PROVIDING PASSIVE SCROLL HINTS

(71) Applicant: Amazon Technologies, Inc., Seattle, WA (US)

(72) Inventors: John Everett Gill, Westchester, NY (US); Michael Lowenstern, Brooklyn, NY (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 16/664,518

(22) Filed: Oct. 25, 2019

(51) Int. Cl.
*G06F 3/0485* (2013.01)
*G06F 3/0346* (2013.01)
*G06F 3/01* (2006.01)
*G06F 16/957* (2019.01)

(52) U.S. Cl.
CPC ............ *G06F 3/0485* (2013.01); *G06F 3/017* (2013.01); *G06F 3/0346* (2013.01); *G06F 16/957* (2019.01); *G06F 2200/1637* (2013.01)

(58) Field of Classification Search
CPC .... G06F 3/0485; G06F 3/0346; G06F 16/957; G06F 3/017; G06F 2200/1637
See application file for complete search history.

(56) References Cited

U.S. PATENT DOCUMENTS

| 9,323,351 | B2 * | 4/2016 | Miyazawa | G06F 3/0346 |
|---|---|---|---|---|
| 9,696,809 | B2 * | 7/2017 | Temple | G09G 5/34 |
| 10,514,835 | B2 * | 12/2019 | Eom | G06F 3/04845 |
| 10,656,818 | B1 * | 5/2020 | Winters | G06F 3/04845 |
| 2003/0169280 | A1 * | 9/2003 | Hsieh | G06F 3/0485 345/684 |
| 2009/0265627 | A1 * | 10/2009 | Kim | G06F 1/1694 715/702 |
| 2013/0314446 | A1 * | 11/2013 | Maekawa | G06F 3/04855 345/684 |

(Continued)

FOREIGN PATENT DOCUMENTS

| EP | 0474234 A2 * | 3/1992 | G09G 5/14 |
|---|---|---|---|
| WO | WO-9631819 A2 * | 10/1996 | G06F 3/0485 |

OTHER PUBLICATIONS

Coyier Chris, Moving Backgrounds With Mouse Position, Oct. 4, 2018, https://css-tricks.com/moving-backgrounds-with-mouse-position/ (Year: 2018).*

*Primary Examiner* — Nicholas Ulrich
(74) *Attorney, Agent, or Firm* — Kilpatrick Townsend & Stockton LLP

(57) ABSTRACT

Systems and methods are described herein for passive scroll hints while presenting graphical content via an application (e.g., a web browser). A location of a mouse cursor, touch input, or tilt angle of a user device may be utilized to identify a horizontal and/or vertical shift amount. The horizontal and/or vertical shift amounts may relate to an amount by which graphical content presented via a viewing window of the application may be shifted in a horizontal and/or vertical direction, respectively. The horizontal and vertical shift amounts may be bounded based at least in part on a total width and/or height of the graphical content. Utilizing the techniques described herein, a user may be informed of the existence of additional graphical content that is outside of the area of the viewing window.

20 Claims, 10 Drawing Sheets

(56) References Cited

U.S. PATENT DOCUMENTS

| | | | | |
|---|---|---|---|---|
| 2014/0129988 A1* | 5/2014 | Liang | ............... | G06F 3/04815 |
| | | | | 715/838 |
| 2014/0304644 A1* | 10/2014 | Pereira | ............... | G06F 3/0482 |
| | | | | 715/784 |
| 2017/0108936 A1* | 4/2017 | Feinstein | ............ | G06F 3/0485 |
| 2019/0220182 A1* | 7/2019 | Wu | ................. | G06F 16/9577 |

* cited by examiner

TECHNIQUES FOR PROVIDING PASSIVE SCROLL HINTS

BACKGROUND

Web browsers are used to view online content. When a user visits a webpage and the content of the webpage is larger than the size of the current browser window, the browser may indicate the existence of additional content by presenting a horizontal and/or vertical scrollbar. These scrollbars come in a variety of styles depending on the web browser being utilized. However, these scrollbars utilize space within the window and can detract from the displayed content. Embodiments described herein address these issues individually and collectively.

BRIEF DESCRIPTION OF THE DRAWINGS

Various embodiments in accordance with the present disclosure will be described with reference to the drawings, in which.

DETAILED DESCRIPTION

Figure 1:
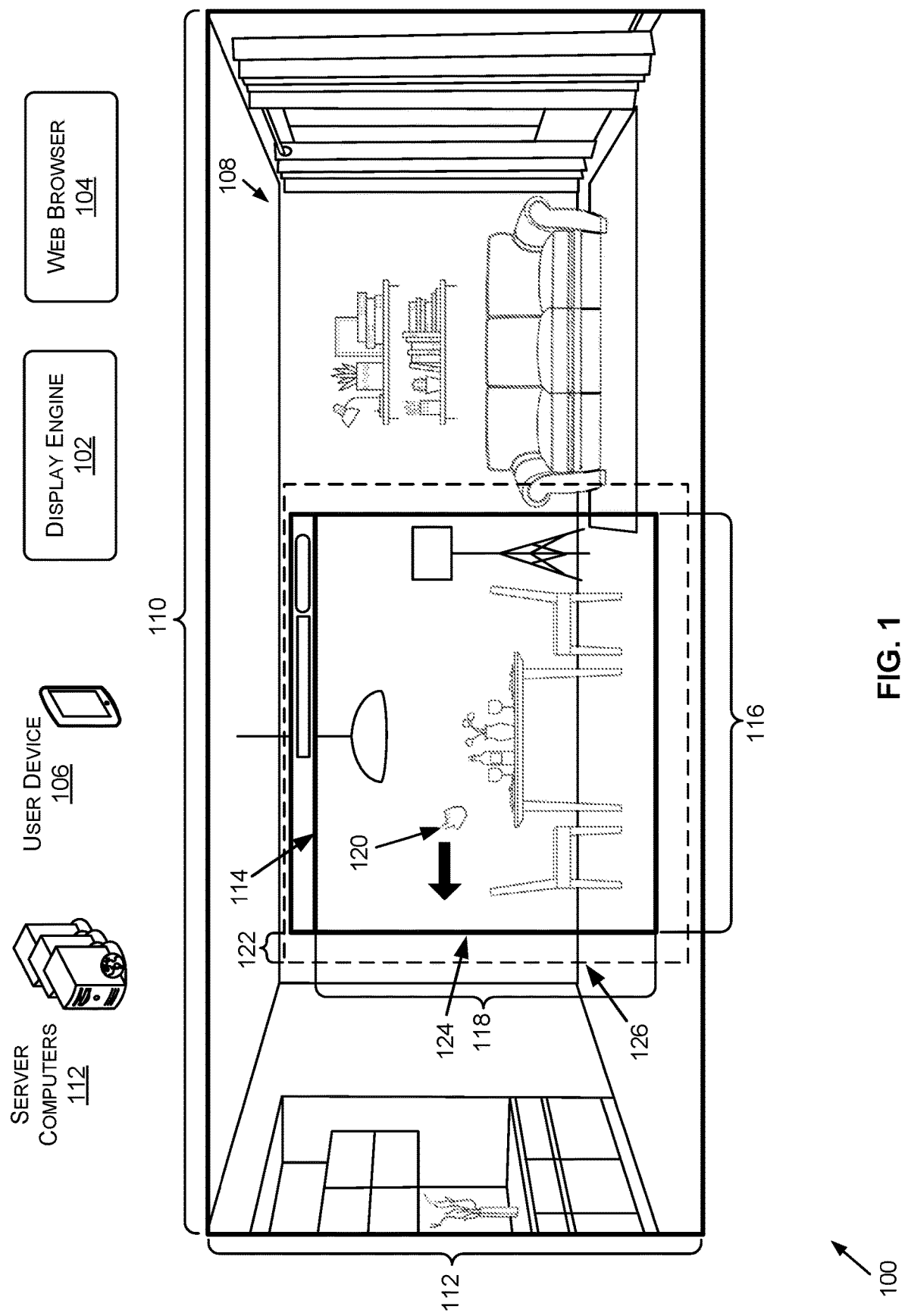
FIG. 1 illustrates an exemplary environment for providing a passive scroll hint utilizing a display engine, in accordance with at least one embodiment.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Techniques described herein are directed to providing passive scroll hints within graphical content. "Graphical content" may include any suitable electronic content having a visual component that is capable of being rendered by a web browser. A "web browser" (also referred to herein as a "browser") is a software application for accessing information on a network (e.g., the Internet). A web browser may include an interpreter configured to interpret code (e.g., JavaScript) received as input.

According to some embodiments, a user may utilize a web browser application executing on their device (e.g., a user device such as a laptop, a smartphone, a desktop computer, etc.) to access content on the Internet. In some examples, the accessed content may be graphical in nature. By way of example, a user may enter as input, a uniform resource location (URL) to navigate to a specific webpage. The webpage content may include graphical content such as a background image. The background image may be initially larger than the current dimensions of the viewing window. Thus, at least some part of the image may be initially hidden from view. Conventionally, scrollbars may have been utilized to indicate the existence of the hidden content. However, scrollbars are intrusive, taking up space and detracting from the overall appearance of the displayed content.

To reduce the use of these intrusive scrollbars, a display engine is provided. In some embodiments, the display engine may be provided in a scripting language (e.g., JavaScript) which is interpretable by the web browser. The display engine may configure the web browser to provide one or more passive scroll hint(s) upon detecting movement of a mouse, a touch input, or a tilt of the device. For example, the viewing window of the web browser may initially display a portion of the graphical content (e.g., the background image) corresponding to a size of the viewing window. The display engine may be configured to receive interaction events from the browser indicating mouse/cursor movements (or touch input movements, or tilt angles of the device, according to the input utilized by the user). By way of example, interaction events may indicate a location of the mouse cursor within the viewing window. In order to indicate that there is additional content outside of the viewing window, the display engine may determine an amount by which the graphical content may be horizontally shifted as the cursor is moved. In other words, as the user moves the cursor toward the left of the viewing window, the graphical content may appear to shift slightly to the right to indicate the existence of additional content to the left of the viewing window. A similar process may be provided with respect to a vertical shift. The shift amount may be bounded by a threshold. For example, the content may only be shifted an amount corresponding to 1% (e.g., a scaling value) of the total width (or height for vertical shifts) of the viewing window (or in some embodiments, the graphical content).

In some embodiments, the user may scroll through the graphical content. One way this can be accomplished is for the user to execute a dragging action with their input device (e.g., a mouse, a fingertip or pen, etc.) although any suitable scrolling event may be utilized such as moving scroll bars, utilizing mouse wheels, providing keyboard inputs, or the like. While the graphical content is manipulated during the scrolling event (e.g., scrolled to the left or right, up or down), one or more scrolling indicators may be presented. These scrolling indicators may utilize less space than some traditional scroll bars. The scrolling indicators may indicate a position of the viewing window with respect to the graphical content and/or the existence of additional content in one or more directions with respect to the current portion of the graphical content being displayed in the viewing window.

In at least one embodiment, boundaries within the graphical content may be identified. These boundaries may be utilized to restrict the positioning of the viewing window with respect to the graphical content. By way of example, the display engine may determine x coordinates corresponding to a distance from each side of the content. The specific distance can be determined based at least in part on a scaling value. For example, the x coordinates of a left and a right boundary within the graphical content may be determined based at least in part on determining a width corresponding to 1% (or another scaling value) of the overall width of the viewing window (or in some embodiments, the width of the graphical content). The display engine may restrict the positioning of the graphical content during a scrolling event based at least in part on these boundaries. That is, the user may be restricted from scrolling the content past these boundaries. Should the user position the boundary of the graphical content to align with an edge of the viewing window, passive scroll hint(s) may still be available as some portion of the graphical content was reserved by utilizing the determined boundaries.

By utilizing the techniques provided herein, the experience of the user is improved both by alleviating the user of intrusive scrollbars while still providing the user the knowledge that additional content exists.

FIG. 1 illustrates an exemplary environment 100 for providing a passive scroll hint utilizing a display engine 102, in accordance with at least one embodiment. In some embodiments, the web browser 104 may be configured to interpret code corresponding to the display engine 102. By way of example, the display engine 102 may be provided in a scripting language that is interpreted by the web browser 104 to provide the functionality described herein.

In some embodiments, the web browser 104 and the display engine 102 may execute on a user device 106. In operation, a user may utilize web browser 104 to navigate to a particular webpage. One example webpage is illustrated in FIG. 1. As depicted in FIG. 1, the webpage may include graphical content 108. Graphical content may be any suitable dimensions (e.g., width 110 and height 112). Width 218 may correspond to the width 110 of FIG. 1. The web browser 104 may provide a viewing window 114. The viewing window 114 may include a portion of the web browser interface within which content may be viewed. The viewing window 114 may not include user interface elements of the web browser 104 such as search bars and menu options (or at least such user interface elements may be hidden at least part of the time). As depicted in FIG. 1, the viewing window 114 may be any suitable dimensions (e.g., width 116, height 118). In some embodiments, the width and height of the viewing window 114 may be less than the width and height of the graphical content 108 such that the viewing window 114 presents only a portion and not all of the graphical content 108.

The webpage may include code corresponding to the display engine 102. Upon loading the webpage, the web browser may execute the functionality of the display engine 102. In some embodiments, the display engine may configure the web browser 104 to update the relative position of the graphical content 108 with respect to the viewing window 114 based at least in part on movement of the cursor 120. As a non-limiting example, the user may use a mouse to move cursor 120 to the left as depicted. The cursors movement may be detected by the web browser 104 which may generate a number of interaction events corresponding to the movement. Upon detecting an interaction event, the web browser 104 may execute the functionality of the display engine 102. The display engine 102 may determine an amount by which the graphical content may be horizontally shifted based at least in part on the position of the cursor within the viewing window 114. As the cursor 120 is moved to the left, the graphical content 108 may be shifted to the right such that content in the overflow area 122 may be displayed. The graphical content 108 may be shifted until the cursor 120 reached an edge 124 of the viewing window 114. When the cursor 120 reaches the edge 124, the graphical content 108 may be shifted to the right such that the edge 124 aligns with a boundary 126 of the overflow area 122. The width of the overflow area 122 may be determined based at least in part on a predetermined scaling value (0.05 corresponding to 5%) of the width 110 of the graphical content 108 (or in some embodiments, the width 116 of the viewing window). In other embodiments, the width of the overflow area 122 may be configurable.

Figure 2:
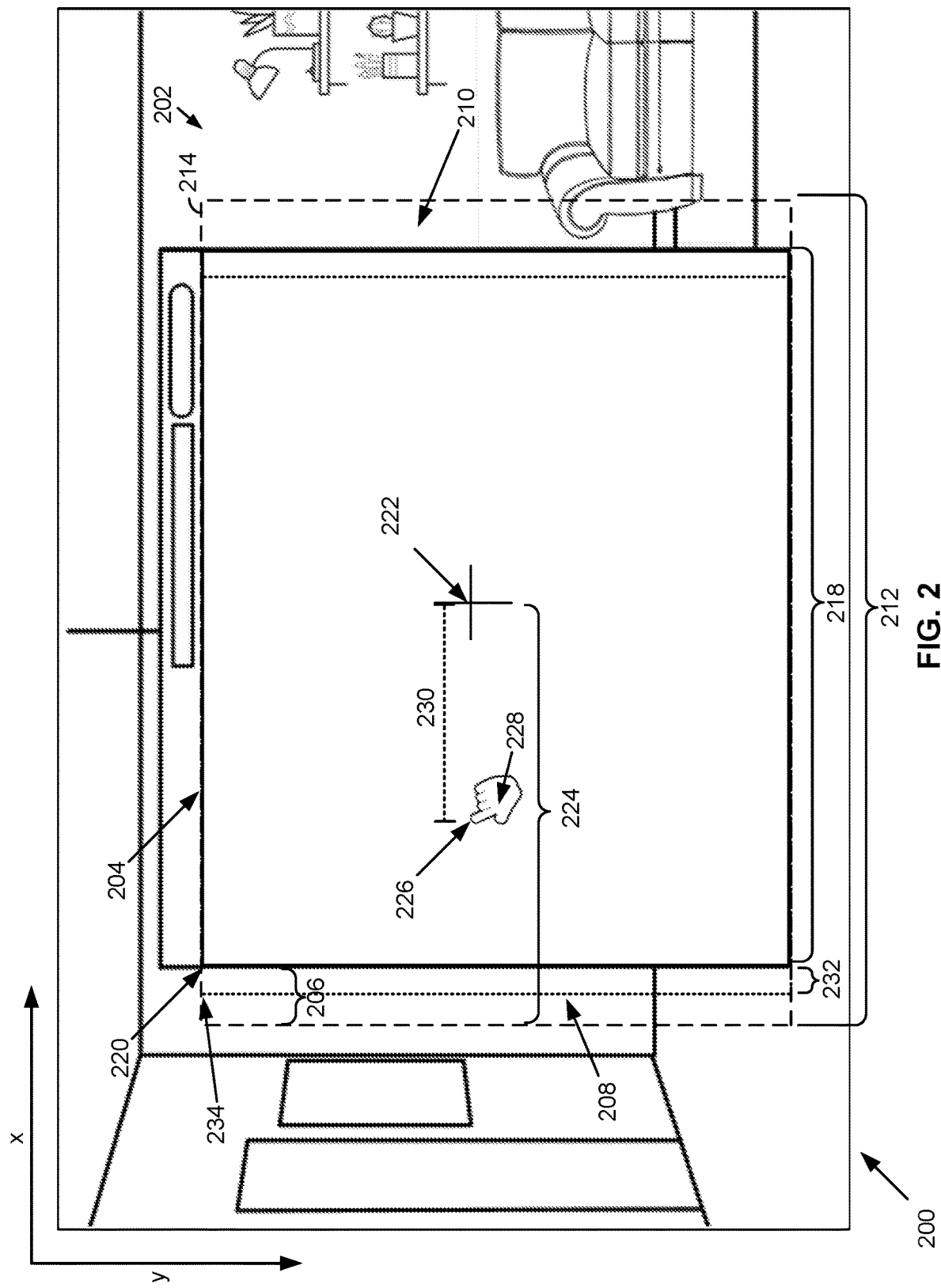
FIG. 2 illustrates an exemplary process for determining an amount by which graphical content is to be horizontally shifted to provide a passive scroll hint, in accordance with at least one embodiment.

FIG. 2 illustrates an exemplary process 200 for determining an amount by which graphical content 202 (e.g., the graphical content 108 of FIG. 1) is to be horizontally shifted to provide a passive scroll hint, in accordance with at least one embodiment. The graphical content 202 may be an example of the graphical content 108 of FIG. 1. It should be appreciated that the graphical content 202 may be the same as graphical content 108 although only a portion of the graphical content 202 is depicted within FIG. 1. Graphical content 202 may have a width 218 (e.g., width 110 as depicted in FIG. 1). The viewing window 204 may be an example of the viewing window 114 of FIG. 1. A predefined or configurable scaling value may be identified. In some embodiments the scaling value may correspond to percentage (e.g., 1%, 2%, 5%, etc.).

As a non-limiting example, the width of graphical content 202 (e.g., the graphical content 108) may correspond to 500 units. A width of the viewing window may correspond to 100 units The units utilized may be any suitable unit of measurement. A predefined scaling value may equal 0.02 (corresponding to 2%). To identify a width 206 of an overflow area 208 (to the left of the viewing window 204) and overflow area 210 (to the right of the viewing window 204) the width 110 (500 units) (or width 116) may be multiplied by the scaling value (0.02). The resultant value (e.g., 10 units) may be utilized as the width 206 of the overflow area 208 and the overflow area 210.

An overall width 212 (e.g., 120 units) of a content portion 214 may be determined based at least in part on the width of the viewing window 204 (e.g., width 116 of FIG. 1) plus the width 206 of each of the overflow areas 208 and 210 (e.g., an amount by which the graphical content 202 may be horizontally shifted).

In some embodiments, a point of the viewing window 204 may be set to a specific offset value corresponding to an x, y coordinate of the graphical content 202. By way of example, a top, left-most corner of the graphical content 202 may be (0,0). Each unit to the right of (0,0) may increment until the top, right-most edge of the graphical content 202 is reached. In this example, the top, right-most edge of the graphical content 202 may be (500, 0). The display engine may be configured to update a parameter (e.g., a horizontal offset value) of the viewing window 204 corresponding to an x-coordinate of the graphical content 202 that corresponds to a corner 220 of the viewing window 204. It should be appreciated that the corner 220 of the viewing window 204 is used as an illustrative example and that the parameter may correspond to any portion of the viewing window 204. What is to be appreciated is that the relative position of the graphical content 202 with respect to the viewing window 204 may be manipulated via the parameter of the viewing window 204. In the example depicted in FIG. 2, the corner 220 may correspond to coordinates (200, 50) within the graphical content 202.

In some embodiments, a (horizontal) center point 222 may be determined by dividing the width 218 (100 units) by 2. Width 224 may be determined by dividing the width 212 by 2 (e.g., 50 units). In this example, the center point 222 may have an x-coordinate equal to 250.

A interaction event may be detected (e.g., by the web browser 104 of FIG. 1) and provided to the display engine 102 of FIG. 1. The location 226 of cursor 228 may be identified in the interaction event. The location 226 may correspond to a distance 230 equal to approximately half of the width 224. Thus, the x-coordinate at location 226 may equal 230. The x-coordinate of the location 226 (e.g., 220) may be subtracted from the x-coordinate of center point 222 (e.g., 250) to give the distance 230 relative to the center point 222. In this scenario, the distance 230 may be equal to −30 units corresponding to the x-coordinate of location 226 being 30 units to the left of the x-coordinate of center point 222. The (relative) distance 230 (e.g., −30 units) may be divided by the width 224 (e.g., 60 units) to identify a percentage of the distance 230 travelled with respect to the width 224. By way of example, the location 226 may be −0.5 (e.g., 50% of the distance the cursor 228 could travel to the left of center point 222. The resultant value (e.g., −0.5) may be multiple by the width 206 (e.g., 10 units, the horizontal shift threshold for shifting the graphical content 202 to the right) to identify a −5 unit horizontal shift value quantifying an amount (e.g., distance 232) by which the graphical content 202 is to be shifted.

To effectuate the horizontal shift, the display engine may update a parameter of the viewing window 204 to correspond to the appropriate x-coordinate with respect to the horizontal shift value. For example, if the parameter identified corner 220 as corresponding to coordinates (200, 50) of the graphical content 202, then the parameter may be updated such that the corner 220 corresponds to the coordinates (195, 50) as depicted at 234. By updating the parameter in this manner, the graphical content 202 may appear to the user as being shifted to the right.

It should be appreciated that the specific steps discussed in connection with FIG. 2 are illustrative in nature. Other formulas may be utilized to identify the horizontal shift value. These formulas may also determine a horizontal shift into the overflow area 208 (or 210) based at least in part on determining a proportional distance travelled by the cursor from center point 222 (or another suitable reference point) with respect to width 224 (or a width corresponding to a distance between the center point 222 (or the same reference point) and the right edge of overflow area 210).

Figure 3:
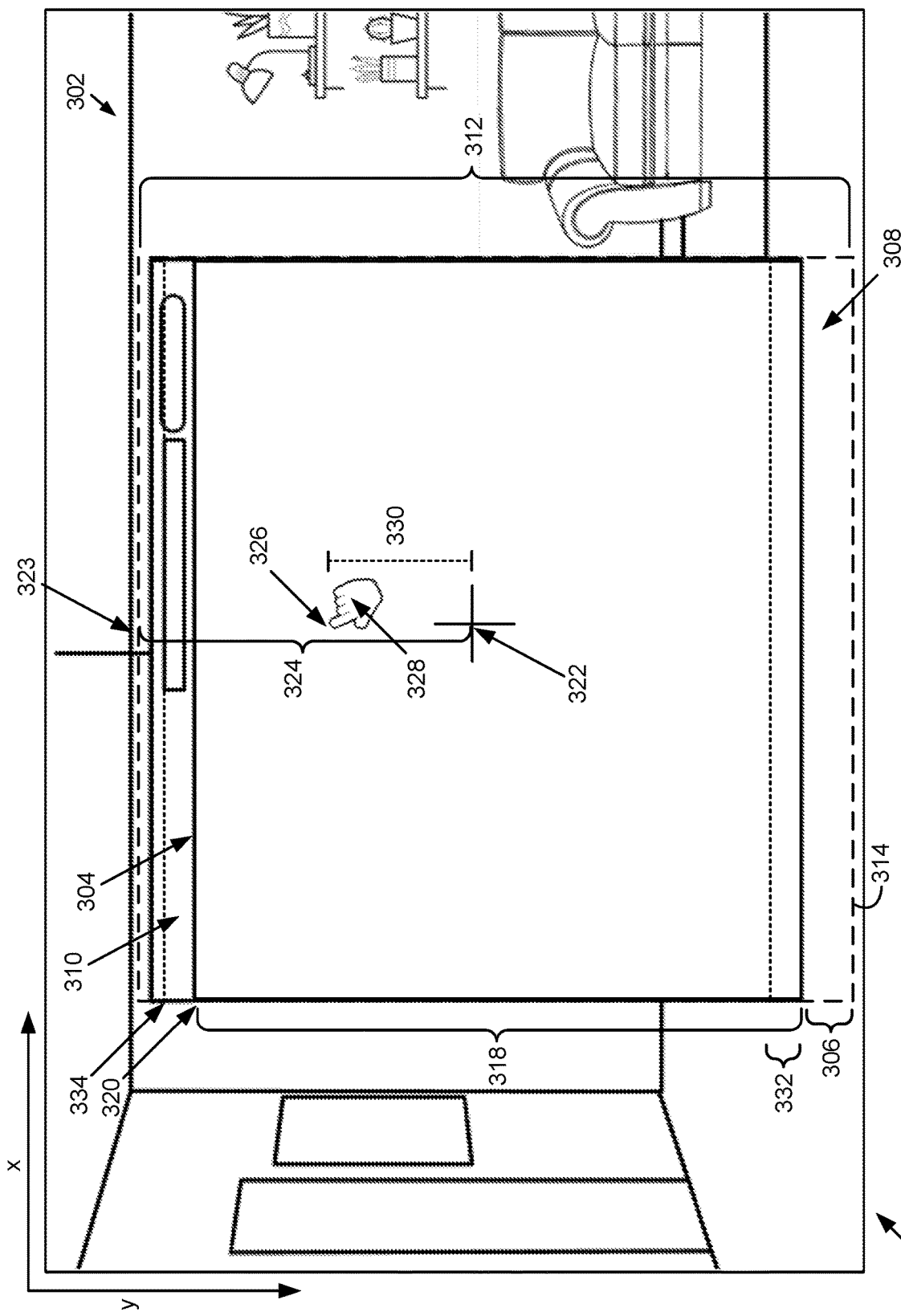
FIG. 3 illustrates an exemplary process for determining an amount by which graphical content is to be vertically shifted to provide a passive scroll hint, in accordance with at least one embodiment.

FIG. 3 illustrates an exemplary process 300 for determining an amount by which graphical content 302 (e.g., the graphical content 108 of FIG. 1) is to be vertically shifted to provide a passive scroll hint, in accordance with at least one embodiment. The graphical content 302 may be an example of the graphical content 108 of FIG. 1 and the graphical content 202 of FIG. 2. It should be appreciated that the graphical content 302 may be the same as graphical content 108 and 202 although only a portion of the graphical content 302 is depicted within FIG. 3. Graphical content 302 may have a height 318 (e.g., height 112 of FIG. 1). The viewing window 304 may be an example of the viewing window 114 of FIG. 1. A predefined or configurable scaling value may be identified. In some embodiments the scaling value may correspond to percentage (e.g., 1%, 2%, 5%, etc.).

As a non-limiting example, the height of graphical content 302 (e.g., the graphical content 202) may correspond to 200 units. A height of the viewing window 304 may correspond to 100 units. The units utilized may be any suitable unit of measurement and may be the same as the units for measuring height as discussed above in connection with FIG. 2. A predefined scaling value may equal 0.02 (corresponding to 2%). To identify a height 306 of an overflow area 308 (below the viewing window 204) and overflow area 310 (above the viewing window 304) the height 112 (200 units) of the graphical content 302 (or height 118 of the viewing window 304) may be multiplied by the scaling value (0.02). The resultant value (e.g., 4 units) may be utilized as the height 306 of the overflow areas 308 and 310.

An overall height 312 (e.g., 208 units) of a content portion 314 may be determined based at least in part on the height of the viewing window 204 (e.g., height 112 of FIG. 1) plus the height 306 of each of the overflow areas 308 and 310 (e.g., an amount by which the graphical content 202 may be vertically shifted).

In some embodiments, a point of the viewing window 304 may be set to a specific offset value corresponding to an x, y coordinate of the graphical content 302. By way of example, a top, left-most corner of the graphical content 302 may be (0,0). Each unit traversed in the y direction (downward) may increment until a bottom, left-most edge of the graphical content 302 is reached. In this example, the bottom, left-most edge of the graphical content 202 may be (0, 200). The display engine may be configured to update a parameter (e.g., a vertical offset value) of the viewing window 304 corresponding to a y-coordinate of the graphical content 302 that corresponds to a corner 320 of the viewing window 304. It should be appreciated that the corner 320 of the viewing window 304 is used as an illustrative example and that the parameter may correspond to any portion of the viewing window 304. What is to be appreciated is that the relative position of the graphical content 302 with respect to the viewing window 304 may be manipulated via the parameter of the viewing window 304. In the example depicted in FIG. 3, the corner 320 may correspond to coordinates (200, 50) within the graphical content 302.

In some embodiments, a (vertical) center point 322 may be determined by dividing the height 312 (108 units) by 2 (e.g., 54 units). Height 324 may be identified by dividing height 318 by 2 (e.g., 50 units). In this example, the center point 322 may have an y-coordinate equal to 100 units.

A interaction event may be detected (e.g., by the web browser 104 of FIG. 1) and provided to the display engine 102 of FIG. 1. The location 326 of cursor 328 may be identified in the interaction event. The location 326 may correspond to a distance 330 equal to approximately 40 percent of the width 324. Thus, the y-coordinate at location 326 may equal approximately 71.6. The y-coordinate of the location 326 (e.g., 71.6) may be subtracted from the y-coordinate of center point 222 (e.g., 100) to give the distance 330 relative to the center point 222. In this scenario, the distance 330 may be equal to −28.4 units corresponding to the y-coordinate of location 326 being 28.4 units above the y-coordinate of center point 322. The (relative) distance 330 (e.g., −28.4 units) may be divided by the width 324 (e.g., 54 units) to identify a percentage of the distance 330 travelled with respect to the width 324. By way of example, the location 326 may be −0.52.6 (e.g., 52.6% of the distance the cursor 328 could travel above center point 322. The resultant value (e.g., −0.526) may be multiple by the width 306 (e.g., 4 units, the vertical shift threshold for shifting the graphical content 202 upward or downward) to identify a −2.1 unit horizontal shift value quantifying an amount (e.g., distance 323) by which the graphical content 302 is to be shifted.

To effectuate the vertical shift, the display engine may update a parameter (e.g., a vertical offset parameter) of the viewing window 204 to correspond to the appropriate y-coordinate with respect to the vertical shift value. For example, if the parameter identified corner 320 as corresponding to coordinates (200, 50) of the graphical content 302, then the parameter may be updated such that the corner 320 corresponds to the coordinates (200, 47.9) as depicted at 334. By updating the parameter in this manner, the graphical content 302 may appear to the user as being shifted to the right.

It should be appreciated that although the horizontal shift value of FIG. 2 and the vertical shift value of FIG. 3 are depicted separately, any movement of the mouse (or a touch input) may include both vertical and horizontal movement. Accordingly, the process 200 and 300 may both be performed for each interaction event indicating motion in both a vertical and horizontal direction. It should be appreciated that although distances may be calculated from a center point of the viewing window in the examples of FIGS. 2 and 3, distances may be similarly calculated from any suitable reference point (e.g., reference point 323) in order to identify a proportional amount of graphical content initially within an overflow area that may be shifted into view within the viewing window.

It should also be appreciated that the specific steps discussed in connection with FIG. 3 are illustrative in nature. Other formulas may be utilized to identify the vertical shift value. These formulas may also determine a vertical shift into the overflow area 310 (or 308) based at least in part on determining a proportional distance travelled by the cursor from center point 222 with respect to width 224 (or a width corresponding to the distance between the center point 222 and a bottom edge of overflow area 308).

Figure 4:
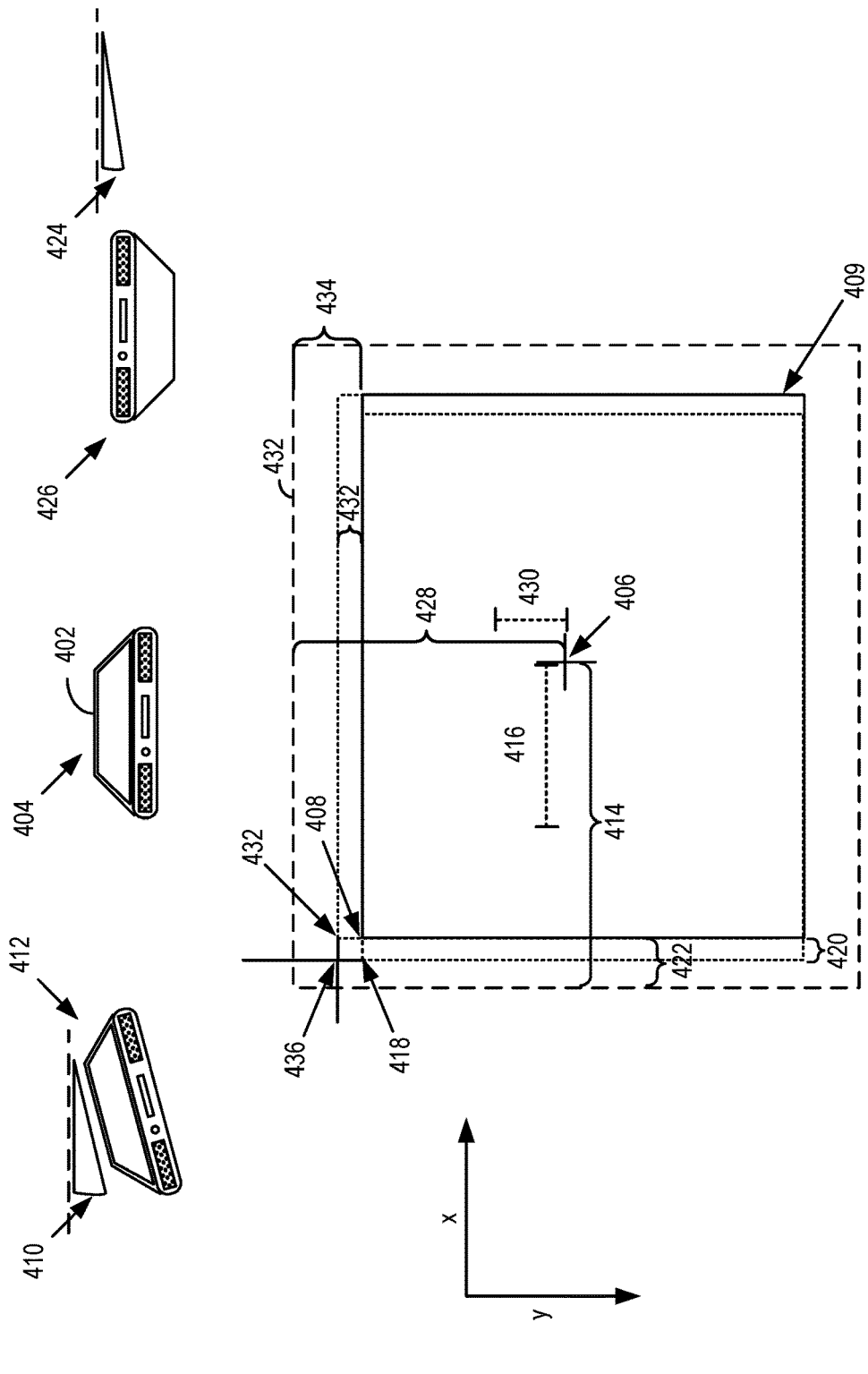
FIG. 4 illustrates an exemplary process for providing passive scroll hints utilizing an accelerometer, in accordance with at least one embodiment.

FIG. 4 illustrates an exemplary process 400 for providing passive scroll hints utilizing an accelerometer, in accordance with at least one embodiment. In some embodiments, the user may tilt his device. When the device is tilted, a similar process as process 200 and 300 may be performed to identify a horizontal and/or vertical shift amount.

For example, a user device (e.g., user device 402) may be utilized to provide accelerometer input. The tilt angle as determined by the accelerometer may be provided to the web browser. The web browser may be configured to generate an interaction event that indicates the tilt angle of the device. At position 404 (e.g., indicating substantially no tilt angle, a tilt angle with some threshold of 0 degrees, etc.), the user device 402 may be considered to be in a neutral position. The neutral position may be considered to correspond to a center point 406 (or another suitable reference point). In the neutral position, the point 408 of the viewing window 409 may be set to coincide with a particular coordinate of the graphical content (e.g., the graphical content 108, 202, or 302 of FIGS. 1-3, respectively). While in the neutral position the graphical content may not be shifted in either the horizontal or the vertical directions.

The user may then tilt the user device 402 to the left by an angle 410 as depicted at 412. Each unit of horizontal tilt (e.g., each degree, or subunit of degree of left/right tilt) may be predefined as corresponding to a particular distance from the center point 406 (or from another suitable reference point). A horizontal threshold angle (e.g., 15 degrees from level) may be predefined and may be utilized as corresponding to the width 414. The distance 416 may be utilized as corresponding to the angle 410 of the current horizontal tilt. The distance 416 may be divided by the width 414 to identify a percentage corresponding to the distance 416 with respect to the width 414. As depicted, the angle 416 may correspond to approximately 50% of the width 414. Based at least in part on this determination, a horizontal parameter (e.g., a horizontal offset parameter) may be updated based at least in part on a current (x, y) coordinate corresponding to point 408 (or another suitable point of the viewing window) such that the graphical content is shifted to cause the point 408 to coincide with coordinates 418 of the graphical content. Or said another way, the graphical content may be shifted such that 50% of the graphical content to the left of the viewing window and within bounding box 432 may be shifted to come into view within the viewing window 409.

The particular horizontal shift value corresponding to distance 420 may be identified based at least in part on width 422 which may be determined from a total width of the graphical content (e.g., width 110 of FIG. 1) and a horizontal scaling value as similarly described above in connection with FIG. 2.

As another example, the user may then tilt the user device 402 forward (e.g., away from his body) by an angle 424 as depicted at 426. Each unit of tilt (e.g., each degree, or subunit of degree of forward/backward tilt) may be predefined as corresponding to a particular distance. A vertical threshold angle (e.g., 15 degrees from level) may be predefined and may be utilized as corresponding to the height 428. The distance 430 may be utilized as corresponding to the angle 424 of the current forward/backward tilt. The distance 430 may be divided by the height 428 to identify a percentage corresponding to the distance 430 with respect to the width 428. As depicted, the angle 424 may correspond to approximately 33% of the width 428. Based at least in part on this determination, a vertical parameter (e.g., a vertical offset parameter) may be updated based at least in part on a current (x, y) coordinate corresponding to point 408 (or another suitable point of the viewing window) such that the graphical content is shifted to cause the point 408 of the viewing window 409 to coincide with coordinates 432 of the graphical content.

The particular vertical shift value corresponding to distance 432 may be identified based at least in part on height 434 of a vertical overflow area which may be determined from a total height of the graphical content (e.g., height 112 of FIG. 1) and a vertical scaling value as similarly described above in connection with FIG. 3. It should be appreciated that the vertical scaling value and the horizontal scaling value may be the same or may differ.

In some embodiments, the user may tilt the user device 402 to the left by angle 410 as well as forward by angle 424. In this scenario, the horizontal and vertical shift values may be combined such that the coordinate of the graphical content corresponding to point 408 may be updated to the coordinates depicted at 436. This may be achieved by updating a horizontal offset parameter of the viewing window 409 to a new value corresponding to the x-coordinate at 436 and updating a vertical offset parameter of the viewing window 409 to a new value corresponding to the y-coordinate at 436.

It should be appreciated that although examples are provided with respect to particular directions (e.g., left, upward, forward, etc.) that similar techniques may be applied in each example to identify horizontal and/or vertical shift amount corresponding to the opposing directions of those depicted in FIGS. 1-4.

Figure 5:
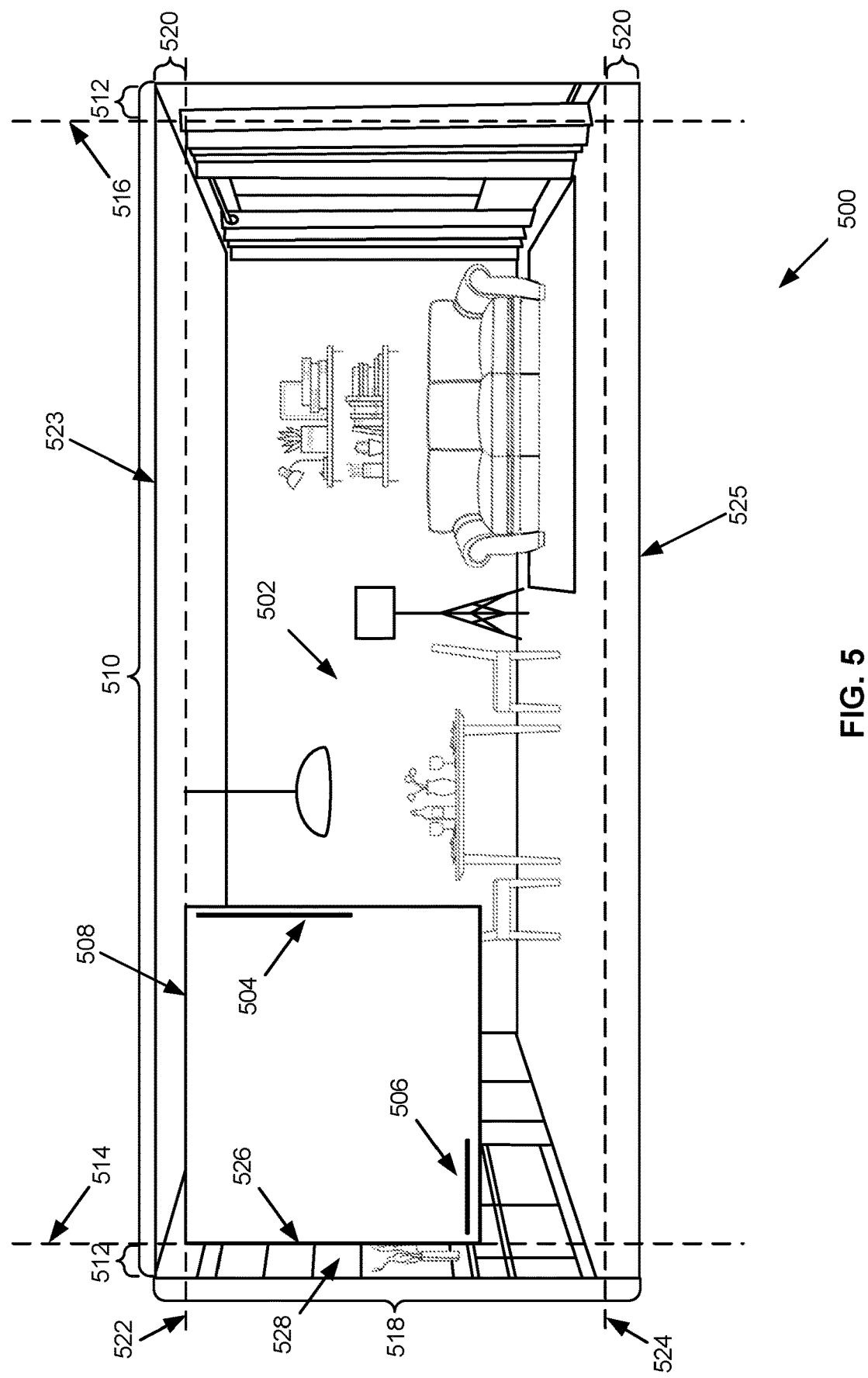
FIG. 5 illustrates an exemplary process for restricting viewing window updates based at least in part on boundaries identified within graphical content, in accordance with at least one embodiment.

FIG. 5 illustrates an exemplary process 500 for restricting viewing window updates based at least in part on boundaries identified within the graphical content, in accordance with at least one embodiment.

In some embodiments, the user may scroll through the graphical content 502. Graphical content 502 may be an example of the graphical content 102, 202, and 302 of FIGS. 1-3, respectively. One way this can be accomplished is for the user to execute a dragging action with an input device (e.g., a mouse, a fingertip or pen, etc.) although other manners of scrolling may be utilized. While the graphical content is manipulated during the scrolling event, one or more scrolling indicators (e.g., scrolling indicator 504 and scrolling indicator 506) may be presented. The position of scrolling indicator 504 may be utilized to indicate a vertical position of the viewing window 508 with respect to the graphical content 502 or at least the existence of additional content either above or below the current content being displayed. The scrolling indicator 506 may be utilized to indicate a horizontal position of the viewing window 508 with respect to the graphical content 502 or at least the existence of additional content either to the left or right of the current content being displayed. These scrolling indicators 504 and 506 may utilize less space than some traditional scroll bars. By way of example, the scrolling indicator may include lines only with no bounding box as would be found in more traditional scroll bars. Thus, the scrolling indicators 504 and 506 may be less intrusive than traditional scroll bars.

In at least one embodiment, boundaries within the graphical content may be identified. As a non-limiting example, a scaling value (e.g., 0.02 corresponding to 2%) may be multiplied by the width 510 (e.g., the width 110 of FIG. 1) of the graphical content 502 to identify an overflow width 512. Boundary 514 and boundary 516 may be identified based at least in part on the overflow width 512 and edge 515 and edge 517, respectively. For example, boundary 514 may be set to a distance that is equal to the overflow width 512 from the edge 515. Boundary 516 may be set to a distance that is equal to the overflow width 520 from the edge 517. Similarly, the scaling value may be multiplied by the height 518 (e.g., the height 112 of FIG. 1) of the graphical content 502 to identify an overflow height 520. Boundary 522 and boundary 524 may be identified based at least in part on the overflow width 520, edge 523, and edge 525, respectively. For example, boundary 522 may be set to a distance that is equal to the overflow width 520 from the edge 523. Boundary 524 may be set to a distance that is equal to the overflow width 520 from the edge 525.

These boundaries may be utilized to restrict the positioning of the viewing window 508 with respect to the graphical content 502. By way of example, the user may be restricted from scrolling the graphical content 502 past boundaries 514, 516, 522, and 524. Should the user position a boundary of the graphical content 502 (e.g., boundary 514) to align with an edge (e.g., edge 526) of the viewing window 508, passive scroll hints may still be available as some portion of the graphical content 502 (e.g., overflow area 528) was reserved by utilizing the determined boundaries.

Figure 6:
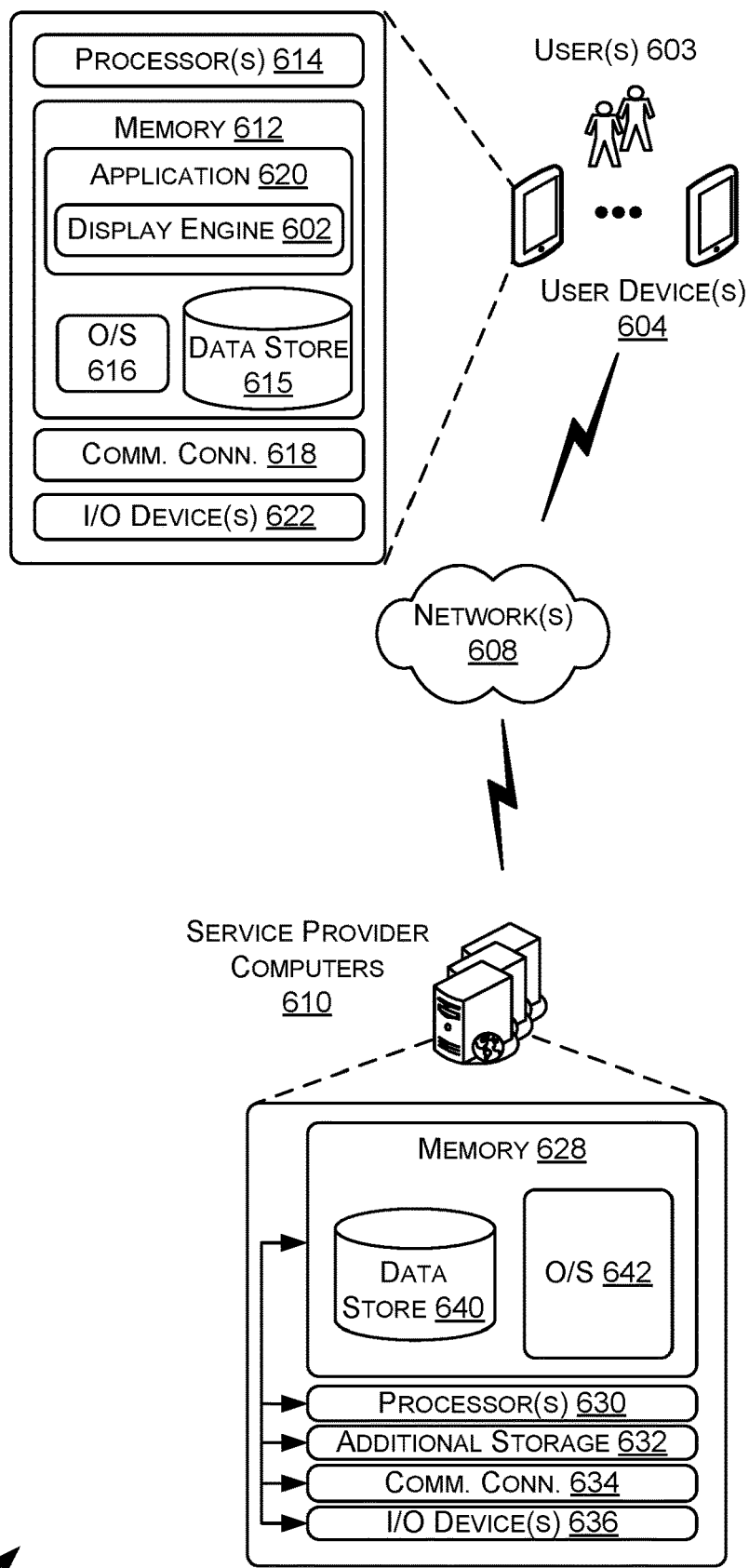
FIG. 6 illustrates an exemplary system for providing passive scroll hints utilizing a display engine, in accordance with at least one embodiment.

FIG. 6 illustrates an exemplary system 600 for providing passive scroll hints utilizing a display engine, in accordance with at least one embodiment. In system 600, one or more user(s) 603 may utilize a user device (e.g., a user device of a collection of user device(s) 604 to provide input to the service provider computer(s) 610. In some embodiments, a user may access any suitable input/output devices (e.g., I/O devices 622 discussed below) such as a keyboard, a mouse, a touchpad, an accelerometer, and the like, to provide input (e.g., via an application 620 running on the user device(s) 604, via manipulation of the user device(s) 604, etc.) to service provider computer(s) 610 via one or more network(s) 608. By way of example, the input may include moving a cursor or other moveable indicator, tilting the user device(s) 604 and/or the like. In some aspects, the application 206 (e.g., a web browser application) operating on the user device(s) 604 may be configured to display content (e.g., webpage content including graphical content) provided by service provider computer(s) 610.

In some examples, the network(s) 208 may include any one or a combination of many different types of networks, such as cable networks, the Internet, wireless networks, cellular networks, and other private and/or public networks. While the illustrated example represents the user(s) 603 accessing content over the network(s) 608, the described techniques may equally apply in instances where the user(s) 603 interact with the service provider computer(s) 610 via the one or more user device(s) 604 over a landline phone, via a kiosk, or in any other suitable manner. It should be appreciated that the described techniques may apply in other client/server arrangements, as well as in non-client/server arrangements (e.g., locally stored applications, etc.). Additionally, in some embodiments, the display engine 602 (an example of the display engine 102 of FIG. 1), discussed further below in more detail, may operate in whole or in part on the user device(s) 204. Thus, in some embodiments, the user(s) 603 may access the functionality of the display engine 602 directly through the user device(s) 604 and/or the service provider computer(s) 610 via user interfaces provided by the application 620.

In some embodiments, the application 620 be utilized to request content from the service provider computer(s) 610 so as to provide the various functionality described above with respect to the display engine 602. For example, the application 606 may include an interpreter configured to interpret one or more scripting languages. The display engine 602 may be provided in one of these scripting languages. Thus, upon loading content including the display engine 602, the application 620 may execute the functionality provided by the display engine 602 including the features described above in connection with FIGS. 1-5. In some embodiments, the application 620 (e.g., a web browser application) may be configured to convey the user's input(s) and/or some portion of the user's input(s) to the display engine 602 and/or the service provider computer(s) 610. The application 620 may be configured to receive, process, and present any suitable data received from the service provider computer(s) 610 (e.g., the graphical content described above in connection with FIGS. 1-5.

The service provider computer(s) 610, perhaps arranged in a cluster of servers or as a server farm, may host the application 620 operating on the user device(s) 604 and/or cloud-based software services. Other server architectures may also be used to host the application 620 and/or cloud-based software services. The application 620 operating on the user device(s) 604 may be capable of handling requests from the user(s) 603 and serving, in response, various user interfaces and/or output that can be presented at the user device(s) 604. In some embodiments, the application 620 operating on the user device(s) 604 can present any suitable type of website that supports user interaction. The described techniques can similarly be implemented outside of the application 620, such as with other applications running on the user device(s) 604.

The user device(s) 604 may be any suitable type of computing device such as, but not limited to, a mobile phone, a touch screen device, a smartphone, a personal digital assistant (PDA), a laptop computer, a desktop computer, a tablet PC, an electronic book (e-book) reader, etc. In some examples, the user device(s) 604 may be in communication with the service provider computer(s) 610 via the network(s) 608, or via other network connections.

In one illustrative configuration, the user device(s) 604 may include at least one memory 612 and one or more processing units (or processor(s)) 614. The processor(s) 614 may be implemented as appropriate in hardware, computer-executable instructions, firmware, or combinations thereof. Computer-executable instruction or firmware implementations of the processor(s) 614 may include computer-executable or machine-executable instructions written in any suitable programming language to perform the various functions described.

The memory 612 may store program instructions that are loadable and executable on the processor(s) 614, as well as data generated during the execution of these programs. Depending on the configuration and type of user computing device, the memory 612 may be volatile (such as random access memory (RAM)) and/or non-volatile (such as read-only memory (ROM), flash memory, etc.). The user device(s) 604 may also include additional removable storage and/or non-removable storage including, but not limited to, magnetic storage, optical disks, and/or tape storage. The disk drives and their associated computer-readable media may provide non-volatile storage of computer-readable instructions, data structures, program modules, and other data for the computing devices. In some implementations, the memory 612 may include multiple different types of memory, such as static random access memory (SRAM), dynamic random access memory (DRAM), or ROM.

Turning to the contents of the memory 612 in more detail, the memory 612 may include an operating system 616, one or more data stores 615, and one or more application programs, modules, or services for implementing the features of the display engine 602 disclosed herein, provided via the application 620. The application 620 may be configured to receive, store, and/or display a network page or other interface for interacting with the service provider computer(s) 610. In some embodiments, the memory 612 may store access credentials and/or other user information such as, but not limited to, user IDs, passwords, and/or other user information. In some examples, the user information may include information for authenticating an account access request such as, but not limited to, a device ID, a cookie, an IP address, a location, or the like.

The user device(s) 604 may also contain communications connection(s) 618 that allow the user device(s) 604 to communicate with a stored database, another computing device (e.g., another of the user device(s) 604) or server (e.g., the service provider computer(s) 610), user terminals and/or other devices on the network(s) 608. The user device(s) 604 may also include I/O device(s) 622, such as a keyboard, a mouse, a touch input device, a display, speakers, a printer, an accelerometer, a gyroscope, etc.

In some aspects, the service provider computer(s) 610 may also be any suitable type of computing devices such as, but not limited to, a mobile phone, a smart speaker, smart phone, a personal digital assistant (PDA), a laptop computer, a desktop computer, a server computer, a thin-client device, a tablet PC, etc. Additionally, it should be noted that in some embodiments, the service provider computer(s) 610 are executed by one more virtual machines implemented in a hosted computing environment. The hosted computing environment may include one or more rapidly provisioned and released computing resources, which computing resources may include computing, networking and/or storage devices. A hosted computing environment may also be referred to as a cloud-computing environment. In some examples, the service provider computer(s) 610 may be in communication with the user device(s) 604 and/or other service providers via the network(s) 608 or via other network connections. The service provider computer(s) 610 may include one or more servers, perhaps arranged in a cluster, as a server farm, or as individual servers not associated with one another. These servers may be configured to implement the functionality described herein as part of an integrated, distributed computing environment.

In one illustrative configuration, the service provider computer(s) 610 may include at least one memory 628 and one or more processing units (or processor(s)) 630. The processor(s) 630 may be implemented as appropriate in hardware, computer-executable instructions, firmware, or combinations thereof. Computer-executable instruction or firmware implementations of the processor(s) 630 may include computer-executable or machine-executable instructions written in any suitable programming language to perform the various functions described.

The memory 628 may store program instructions that are loadable and executable on the processor(s) 630, as well as data generated during the execution of these programs. Depending on the configuration and type of service provider computer(s) 610, the memory 628 may be volatile (such as RAM) and/or non-volatile (such as ROM, flash memory, etc.). The service provider computer(s) 610 or servers may also include additional storage 632, which may include removable storage and/or non-removable storage. The additional storage 632 may include, but is not limited to, magnetic storage, optical disks and/or tape storage. The disk drives and their associated computer-readable media may provide non-volatile storage of computer-readable instructions, data structures, program modules, and other data for the computing devices. In some implementations, the memory 628 may include multiple different types of memory, such as SRAM, DRAM, or ROM.

The memory 628, the additional storage 632, both removable and non-removable, are all examples of computer-readable storage media. For example, computer-readable storage media may include volatile or non-volatile, removable or non-removable media implemented in any method or technology for storage of information such as computer-readable instructions, data structures, program modules, or other data. The memory 628 and the additional storage 632 are all examples of computer storage media. Additional types of computer storage media that may be present in the service provider computer(s) 610 may include, but are not limited to, PRAM, SRAM, DRAM, RAM, ROM, EEPROM, flash memory or other memory technology, CD-ROM, DVD or other optical storage, magnetic cassettes, magnetic tape, magnetic disk storage or other magnetic storage devices, or any other medium which can be used to store the desired information and which can be accessed by the service provider computer(s) 610. Combinations of any of the above should also be included within the scope of computer-readable media.

Alternatively, computer-readable communication media may include computer-readable instructions, program modules, or other data transmitted within a data signal, such as a carrier wave, or other transmission. However, as used herein, computer-readable storage media does not include computer-readable communication media.

The service provider computer(s) 610 may also contain communications connection(s) 634 that allow the service provider computer(s) 610 to communicate with a stored database, another computing device or server, user terminals and/or other devices on the network(s) 608. The service provider computer(s) 610 may also include I/O device(s) 636, such as a keyboard, a mouse, a pen, a voice input device, a touch input device, a display, speakers, a printer, etc.

Turning to the contents of the memory 628 in more detail, the memory 628 may include an operating system 640, one or more data stores 642, and/or one or more application programs, modules, or services for implementing the features disclosed herein, such as the features provided by the display engine 602.

Figure 7:
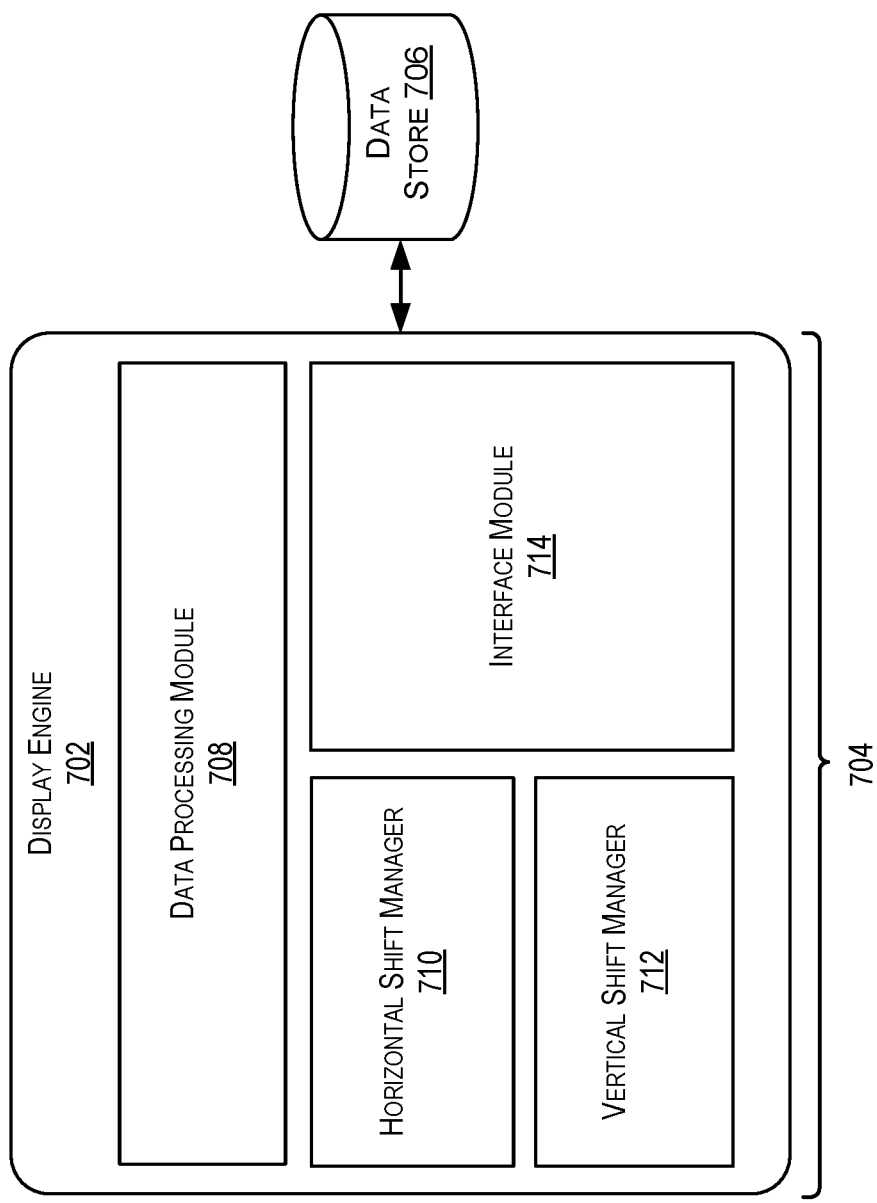
FIG. 7 is a schematic diagram of an example computer architecture for the display engine, including a plurality of modules that may perform functions in accordance with at least one embodiment.

FIG. 7 is a schematic diagram of an example architecture 700 for the display engine 702, including a plurality of modules 704 that may perform functions in accordance with at least one embodiment. The display engine 702 may be an example of the display engine 102 of FIG. 1. The modules 704 may be software modules, hardware modules, or a combination thereof. If the modules 704 are software modules, the modules 704 can be embodied on a computer readable medium and processed by a processor in any of the computer systems described herein. In some embodiments, the display engine 702 may be provided in a scripting language that is interpretable by the application 620 of FIG. 6 (e.g., an example of the web browser 104 of FIG. 1). The modules 704, or some portion of the modules 704, may be operate as separate modules or the functionality provided by the module 704 may be provided in any suitable manner by a greater or fewer number of modules then the number depicted in FIG. 7.

In the embodiment shown in the FIG. 7, a data store 706 is shown, although data can be maintained, derived, or otherwise accessed from various data stores, either remote or local to the display engine 702, to achieve the functions described herein. In at least one embodiment, the data store 706 may be physically located on the user device(s) 604 of FIG. 6. The display engine 702, as shown in FIG. 7, includes various modules 704 such as a data processing module 708, a horizontal shift manager 710, a vertical shift manager 712, and an interface module 714. Some functions of the modules 704 are described below. However, for the benefit of the reader, a brief, non-limiting description of each of the modules is provided in the following paragraphs. In accordance with at least one embodiment, a process is identifying potential feature combinations for a new item.

In at least one embodiment, the display engine 702 includes the data processing module 708. Generally, the data processing module 708 may be utilized to receive and/or transmit any suitable information with respect to any example provided herein. The data processing module 708 may include any suitable number of application programming interfaces (APIs) with which the functionality of the display engine 702 may be invoked. In some embodiments, the data processing module 708 may be configured to receive interaction events (e.g., provided by web browser 104 of FIG. 1, application 620 of FIG. 6, etc.) and execute one or more operations in response to the interaction event. For example, the data processing module 708 may be configured to provide information from the interaction event to one or more of the modules 704. In some embodiments, interaction event data (e.g., such as a location of a cursor/moveable indicator, an indication of a scrolling event, etc.) may be otherwise accessible by the modules 704 (e.g., by accessing parameters associated with the application 620 of FIG. 6 (e.g., a web browser). The receipt of an interaction event may cause the data processing module 708 to invoke functionality provided by any suitable combination of the horizontal shift manager 710, the vertical shift manager 712, and/or the interface module 714. In some embodiments, the data processing module 708 may identify graphical content, a portion of which may be currently displayed at a viewing window. The data processing module 708 may identify an offset value corresponding to a position of the viewing window with respect to the whole of the graphical content. The data processing module 708 may provide this offset value to any suitable module of the display engine 702.

The display engine 702 may include a horizontal shift manager 710. The horizontal shift manager 710 may be configured to provide the functionality described above in connection with FIG. 2 and FIG. 4. For example, the horizontal shift manager 710 may determine (e.g., calculate) a horizontal shift amount corresponding to a movement detected via an interaction event received by the display engine 702. As described above, the horizontal shift amount may be determined based at least in part on various factors such as an overall width associated with the graphical content, a width of a viewing window of the application 620, a horizontal scaling value, a location of a cursor/moveable indicator, a tilt angle of the user device on which the application 620 is executing, a reference point, etc. The horizontal shift manager 710 may be configured to update a horizontal parameter (e.g., a horizontal offset value) of the viewing window based at least in part on the determined horizontal shift amount or, in some cases, the horizontal shift manager 710 may be configured to provide the determined horizontal shift amount to the interface module 714 which may in turn update the horizontal parameter of the viewing window.

The display engine 702 may include a vertical shift manager 712. The vertical shift manager 712 may be configured to provide the functionality described above in connection with FIG. 3 and FIG. 4. For example, the vertical shift manager 712 may determine (e.g., calculate) a vertical shift amount corresponding to a movement detected via an interaction event received by the display engine 702. As described above, the vertical shift amount may be determined based at least in part on various factors such as any suitable combination of an overall height associated with graphical content, a height of a viewing window of the application 620, a vertical scaling value, a location of a cursor/moveable indicator, a tilt angle of the user device on which the application 620 is executing, etc. The vertical shift manager 712 may be configured to update a vertical parameter (e.g., a vertical offset value) of the viewing window based at least in part on the determined vertical shift amount or, in some cases, the vertical shift manager 712 may be configured to provide the determined vertical shift amount to the interface module 714 which may in turn update the vertical parameter of the viewing window.

The display engine 702 may include an interface module 714 which may be configured to provide user interface elements such as scroll bars 504 and 506 of FIG. 5 in response to receiving input indicative of a scrolling action. The user interface elements may be provided for the duration of the scrolling action. The interface module 714 may be configured to hide the scroll bars when a scrolling action is not occurring. In some embodiments, the interface module 714 may be configured to determine boundaries within the graphical content being provided by the application 620 of FIG. 6. By way of example, the interface module 714 may identify any suitable combination of boundaries 514, 516, 522, and/or 524 of FIG. 5. In some cases, the interface module 714 may set the boundaries according to a predefined width or height. In other examples, the interface module 714 may determine (e.g., calculate) the x or y coordinates corresponding to the boundaries 514, 516, 522, and/or 524 based at least in part on a scaling value and the overall width and/or height of the graphical content being provided by the application 620.

Figure 8:
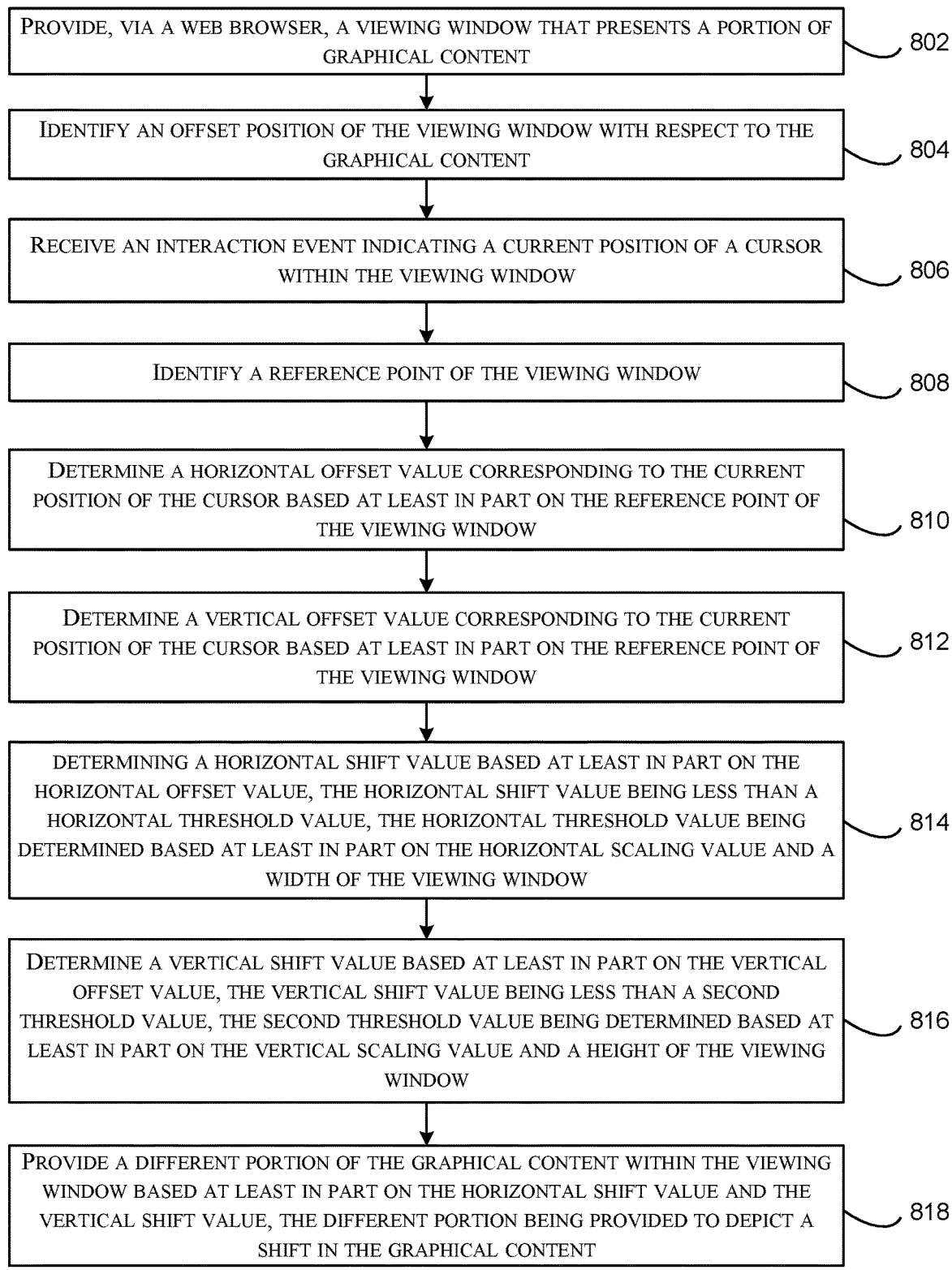
FIG. 8 is a flowchart illustrating an example method for providing passive scroll hints corresponding to graphical content, in accordance with at least one embodiment.

FIG. 8 is a flowchart illustrating an example method 800 for providing passive scroll hints corresponding to graphical content, in accordance with at least one embodiment. It should be appreciated that the operations of the method 800 may be performed in any suitable, not necessarily the order depicted in FIG. 8. Further, the method 800 may include additional, or fewer operations than those depicted in FIG. 8. The operations of method 800 may be performed by any suitable combination of the modules 704 of the display engine 702 of FIG. 7 which may operate in whole or in part on a user device (e.g., one or more of the user device(s) 604 of FIG. 6).

The method 800 may begin at 802, where a viewing window that presents a portion of graphical content may be provided via a web browser. The web browser may be an application operating on a user device.

At 804, an offset position of the viewing window with respect to the graphical content may be identified (e.g., by the data processing module 708). The offset position may correspond to an (x, y) coordinate of the graphical content that corresponds with a portion (e.g., a corner, a top, left-most corner, etc.) of the viewing window.

At 806, an interaction event indicating a current position of a cursor within the viewing window may be received (e.g., by the data processing module 708).

At 808, a reference point of the view window may be identified (e.g., by the horizontal shift manager 710 and/or the vertical shift manager 712). In some embodiments, the reference point may correspond not only with the viewing window but also with at least two overflow areas adjacent to the portion of the graphical content currently visible in the viewing window. The overflow areas may be identified (e.g., by the horizontal shift manager 710 and/or the vertical shift manager 712) based at least in part on a total width and/or height of the graphical content.

At 810, a horizontal offset value corresponding to the current position of the cursor may be determined (e.g., by the horizontal shift manager 710) based at least in part on the reference point of the viewing window. For example, the horizontal shift manager 710 may execute the operations discussed above in connection with FIG. 2 (or FIG. 4) to determine a horizontal offset value.

At 812, a vertical offset value corresponding to the current position of the cursor may be determined (e.g., by the vertical shift manager 712) based at least in part on the reference point of the viewing window. For example, the vertical shift manager 712 may execute the operations discussed above in connection with FIG. 3 (or FIG. 4) to determine a vertical offset value.

At 814, a horizontal shift value may be determined (e.g., by the horizontal shift manager 710) based at least in part on the horizontal offset value. In some embodiments, the horizontal shift value may be less than a horizontal threshold value and the horizontal threshold value may be determined based at least in part on the horizontal scaling value and a width of the graphical content.

At 816, a vertical shift value may be determined (e.g., by the vertical shift manager 712) based at least in part on the vertical offset value. In some embodiments, the vertical shift value may be less than a second threshold value and the second threshold value may be determined based at least in part on the vertical scaling value and a height of the graphical content.

At 818, a different portion of the graphical content may be provided (e.g., by the web browser) within the viewing window based at least in part on the horizontal shift value and the vertical shift value. In some embodiments, the different portion may be provided to depict a shift in the graphical content. In accordance with at least one embodiment, the different portion of graphical content may be provided based at least in part on one or more updates of the viewing window performed by the interface module 714 of FIG. 7.

Figure 9:
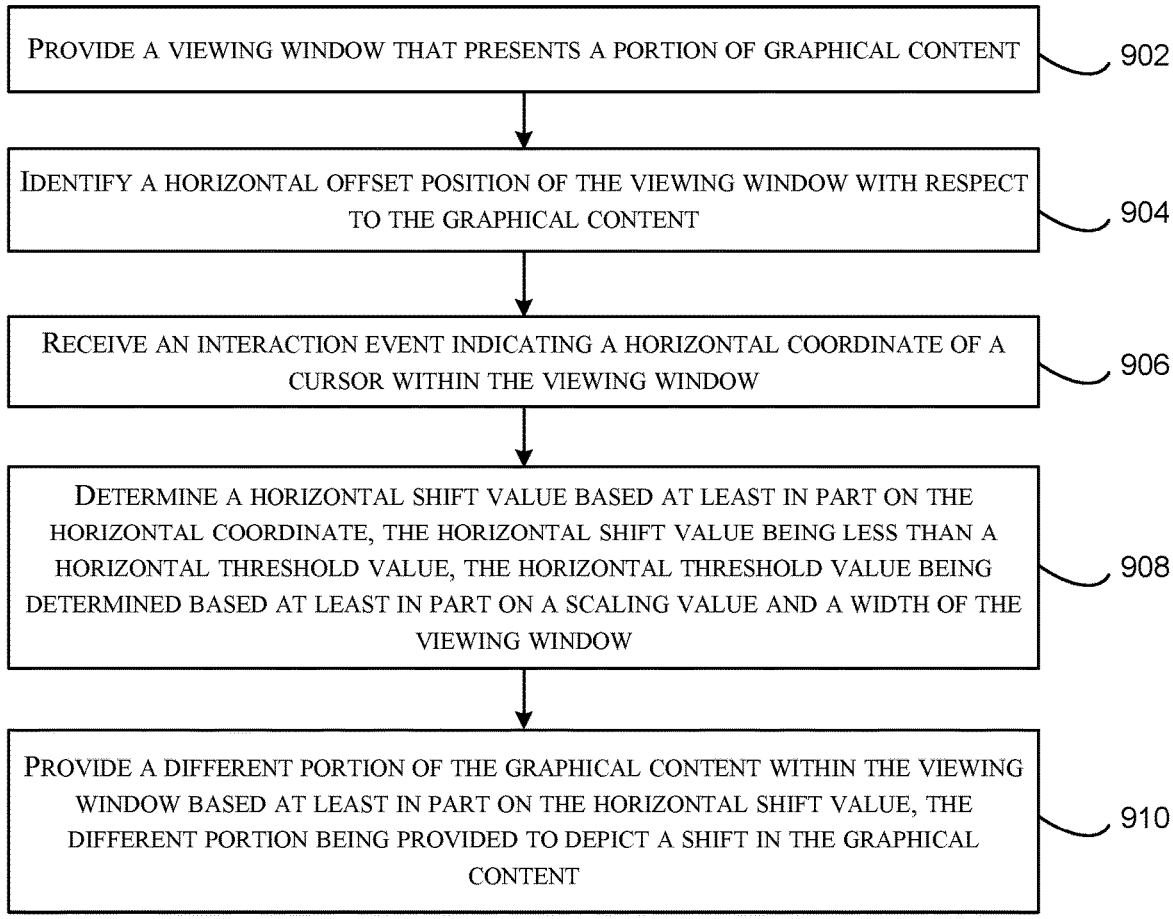
FIG. 9 is another flowchart illustrating another example method for providing passive scroll hints corresponding to graphical content, in accordance with at least one embodiment.

FIG. 9 is another flowchart illustrating another example method 900 for providing passive scroll hints corresponding to graphical content, in accordance with at least one embodiment. The method 900 may be performed by a user device comprising one or more processors and one or more computer-readable memories comprising executable instructions that, when executed by the one or more processors, cause the user device to perform the operations discussed below in connection with FIG. 9. It should be appreciated that the operations of the method 900 may be performed in any suitable, not necessarily the order depicted in FIG. 9. Further, the method 900 may include additional, or fewer operations than those depicted in FIG. 9. The operations of method 900 may be performed by any suitable combination of the modules 704 of the display engine 702 of FIG. 7 which may operate in whole or in part on a user device (e.g., one or more of the user device(s) 604 of FIG. 6).

The method 900 may begin at 902, where a viewing window that presents a portion of graphical content is provided (e.g., by a web browser operating on the user device).

At 904, a horizontal offset position of the viewing window may be determined (e.g., by the data processing module 708) with respect to the graphical content. The horizontal offset position may correspond to an x-coordinate of an (x, y) coordinate that identifies a location within the graphical content.

At 904, an interaction event may be received (e.g., by the data processing module 708). The interaction event may indicate a horizontal coordinate of a cursor within the viewing window. In some embodiments the interaction event may indicate a horizontal coordinate with respect to the graphical content.

At 906, a horizontal shift value may be determined (e.g., by the horizontal shift manager 710) based at least in part on the horizontal coordinate. In some embodiments, the horizontal shift value may be less than a horizontal threshold value. According to some embodiments, the horizontal threshold value may be determined based at least in part on a scaling value and a width of the viewing window (or in some embodiments the width of the graphical content).

At 908, a different portion of the graphical content may be provided (e.g., by the web browser) within the viewing window based at least in part on the horizontal shift value. In some embodiments, the different portion being provided to depict a shift in the graphical content. In accordance with at least one embodiment, the different portion of graphical content may be provided based at least in part on one or more updates of the viewing window performed by the interface module 714 of FIG. 7.

Figure 10:
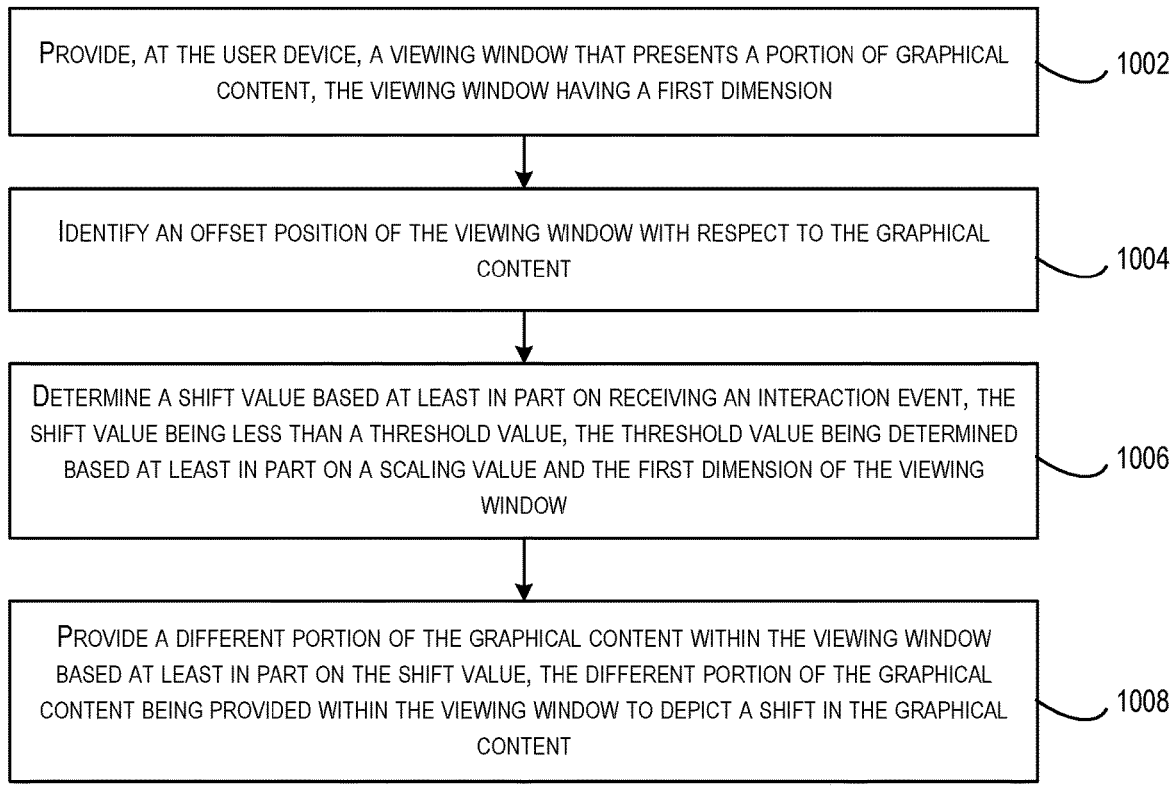
FIG. 10 is yet another flowchart illustrating yet another example method for providing passive scroll hints corresponding to graphical content, in accordance with at least one embodiment.

FIG. 10 is yet another flowchart illustrating yet another example method 1000 for providing passive scroll hints corresponding to graphical content, in accordance with at least one embodiment. The method 1000 may be performed by a user device having a computer-readable storage medium comprising executable instructions that, upon execution by one or more processors, cause the user device to perform method 1000. It should be appreciated that the operations of the method 1000 may be performed in any suitable, not necessarily the order depicted in FIG. 10. Further, the method 1000 may include additional, or fewer operations than those depicted in FIG. 10. The operations of method 1000 may be performed by any suitable combination of the modules 704 of the display engine 702 of FIG. 7 which may operate in whole or in part on a user device (e.g., one or more of the user device(s) 604 of FIG. 6).

The method 1000 may begin at 1002, where a viewing window that presents a portion of graphical content may be provided (e.g., by a web browser) at a user device. In some embodiments, the graphical content may have a first dimension (e.g., a width and/or height).

At 1004, an offset position of the viewing window with respect to the graphical content may be determined (e.g., by the data processing module 708). In some embodiments, the offset position may correspond to an x-coordinate or a y-coordinate of an (x, y) coordinate that identifies a location within the graphical content.

At 1006, a shift value may be determined (e.g., by the horizontal shift manager 710 and/or the vertical shift manager 712) based at least in part on receiving an interaction event. In some embodiments, the shift value may be less than a threshold value. The threshold value may be determined (e.g., by the horizontal shift manager 710 and/or the vertical shift manager 712) based at least in part on a scaling value and the first dimension (e.g., the width and/or height) of the viewing window (or in some embodiments, the width of the graphical content).

At 1006, a different portion of the graphical content may be provided (e.g., by the web browser) within the viewing window based at least in part on the shift value. In some embodiments, the different portion of the graphical content may be provided within the viewing window to depict a shift in the graphical content. In accordance with at least one embodiment, the different portion of graphical content may be provided based at least in part on one or more updates of the viewing window performed by the interface module 714 of FIG. 7.

The various embodiments discussed above can be implemented in a wide variety of operating environments, which in some cases can include one or more user computers, computing devices or processing devices which can be used to operate any of a number of applications. User or client devices can include any of a number of general purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems, and other devices capable of communicating via a network.

Most embodiments utilize at least one network that would be familiar to those skilled in the art for supporting communications using any of a variety of commercially-available protocols, such as Transmission Control Protocol/Internet Protocol ("TCP/IP"), Open System Interconnection ("OSI"), File Transfer Protocol ("FTP"), Universal Plug and Play ("UpnP"), Network File System ("NFS"), Common Internet File System ("CIFS"), and AppleTalk®. The network can be, for example, a local area network, a wide-area network, a virtual private network, the Internet, an intranet, an extranet, a public switched telephone network, an infra-red network, a wireless network, and any combination thereof.

In embodiments utilizing a Web server, the Web server can run any of a variety of server or mid-tier applications, including Hypertext Transfer Protocol ("HTTP") servers, FTP servers, Common Gateway Interface ("CGI") servers, data servers, Java servers, and business application servers. The server(s) also may be capable of executing programs or scripts in response to requests from user devices, such as by executing one or more Web applications that may be implemented as one or more scripts or programs written in any programming language, such as Java®, C, C#, or C++, or any scripting language, such as Perl, Python, or TCL, as well as combinations thereof. The server(s) may also include database servers, including without limitation those commercially available from Oracle®, Microsoft®, Sybase®, and IBM®.

Embodiments can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit ("CPU"), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired)), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or Web browser. It should be appreciated that alternate embodiments may have numerous variations from that described above.

For example, customized hardware might also be used and/or particular elements might be implemented in hardware, software (including portable software, such as applets), or both. Further, connection to other computing devices such as network input/output devices may be employed.

Storage media computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, Electrically Erasable Programmable Read-Only Memory ("EEPROM"), flash memory or other memory technology, Compact Disc Read-Only Memory ("CD-ROM"), digital versatile disk (DVD), or other optical storage, magnetic cassettes, magnetic tape, magnetic disk storage, or other magnetic storage devices, or any other medium which can be used to store the desired information and which can be accessed by a system device. Based at least in part on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the disclosure to the specific form or forms disclosed, but on the contrary, the intention is to cover all modifications, alternative constructions, and equivalents falling within the spirit and scope of the disclosure, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or example language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Preferred embodiments of this disclosure are described herein, including the best mode known to the inventors for carrying out the disclosure. Variations of those preferred embodiments may become apparent to those of ordinary skill in the art upon reading the foregoing description. The inventors expect skilled artisans to employ such variations as appropriate and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. A computer-readable storage medium comprising executable instructions that, upon execution by one or more processors, cause a user device to perform operations comprising:
    providing, at the user device, a viewing window that presents a portion of graphical content, the graphical content having a first dimension;
    identifying an offset position of the viewing window with respect to the graphical content;
    determining a shift value based at least in part on receiving an interaction event that indicates a tilt angle corresponding to a tilt of the user device, the shift value being calculated based at least in part on the tilt angle, the shift value being less than a threshold value, the threshold value being determined based at least in part on a scaling value and the first dimension of the viewing window; and
    providing a different portion of the graphical content within the viewing window based at least in part on the shift value, the different portion of the graphical content being provided within the viewing window to depict a shift in the graphical content.

2. The computer-readable storage medium of claim 1, wherein executing the instructions further causes the user device to perform operations comprising:
    displaying one or more scrolling interface elements based at least in part on receiving the interaction event and input indicating a scrolling action;
    determining the scrolling action has ceased; and
    hiding the scrolling interface elements based at least in part on determining the scrolling action has ceased.

3. The computer-readable storage medium of claim 1, wherein the tilt angle is less than a threshold tilt angle corresponding to the threshold value.

4. The computer-readable storage medium of claim 1, wherein tilting the user device in one direction corresponding to the tilt angle causes the shift of the graphical content, the shift corresponding to the shift value.

5. The computer-readable storage medium of claim 1, wherein executing the instructions further causes the user device to perform operations comprising:
determining a second shift value based at least in part on receiving the interaction event that indicates a second tilt angle corresponding to a second tilt of the user device, the second shift value being calculated based at least in part on the second tilt angle, the second shift value being less than a second threshold value, the second threshold value being determined based at least in part on a second scaling value and a second dimension of the viewing window.

6. The computer-readable storage medium of claim 5, wherein the different portion of the graphical content is provided within the viewing window further based at least in part on the second shift value.

7. The computer-readable storage medium of claim 5, wherein the first dimension is a width of the viewing window and the second dimension is a height of the viewing window.

8. A user device, comprising:
one or more processors; and
one or more computer-readable memories comprising executable instructions that, when executed by the one or more processors, cause the user device to:
provide a viewing window that presents a portion of graphical content;
identify a horizontal offset position of the viewing window with respect to the graphical content;
receive an interaction event indicating a horizontal tilt angle of the user device;
determine a horizontal shift value based at least in part on the horizontal tilt angle, the horizontal shift value being less than a horizontal threshold value, the horizontal threshold value being determined based at least in part on a scaling value and a width of the viewing window; and
provide a different portion of the graphical content within the viewing window based at least in part on the horizontal shift value, the different portion being provided to depict a shift in the graphical content.

9. The user device, of claim 8, wherein the horizontal threshold value represents a percentage of the width of the graphical content.

10. The user device of claim 8, wherein providing the different portion of the graphical content comprises updating a parameter of the viewing window, wherein the parameter corresponds to a particular coordinate of the graphical content.

11. The user device of claim 8, wherein the graphical content has a first width, and wherein the viewing window has a second width that is less than the first width.

12. The user device of claim 11, wherein executing the instructions further causes the user device to determine two horizontal boundaries within the graphical content, the horizontal boundaries being determined based at least in part on the width of the viewing window and the scaling value.

13. The user device of claim 12, wherein executing the instructions further causes the user device to restrict the viewing window from traversing the two horizontal boundaries within the graphical content.

14. A computer-implemented method, comprising:
providing, via a web browser of a user device, a viewing window that presents a portion of graphical content;
identifying an offset position of the viewing window with respect to the graphical content;
receiving an interaction event indicating a horizontal tilt angle and a vertical tilt angle of the user device;
identifying a reference point of the viewing window;
determining a horizontal offset value corresponding to the horizontal tilt angle of the user device based at least in part on a center point of the viewing window;
determining a vertical offset value corresponding to the vertical tilt angle of the user device based at least in part on the center point of the viewing window;
determining a horizontal shift value based at least in part on the horizontal offset value, the horizontal shift value being less than a horizontal threshold value, the horizontal threshold value being determined based at least in part on a horizontal scaling value and a width of the viewing window;
determining a vertical shift value based at least in part on the vertical offset value, the vertical shift value being less than a vertical threshold value, the vertical threshold value being determined based at least in part on a vertical scaling value and a height of the viewing window; and
providing a different portion of the graphical content within the viewing window based at least in part on the horizontal shift value and the vertical shift value, the different portion being provided to depict a shift in the graphical content.

15. The computer-implemented method of claim 14, wherein providing the different portion of the graphical content comprises updating a parameter of the viewing window, and wherein updating the parameter causes the shift in at least one direction corresponding to tilting the user device to be depicted.

16. The computer-implemented method of claim 15, wherein the parameter corresponds to a coordinate of the graphical content that corresponds to a portion of the viewing window.

17. The computer-implemented method of claim 15, wherein the parameter is updated for each subsequent interaction event.

18. The computer-implemented method of claim 14, further comprising providing subsequent portions of the graphical content within the viewing window, wherein providing the subsequent portions of the graphical content halts when the user device has been tilted an angle that corresponds to a first half of the width of the viewing window.

19. The computer-implemented method of claim 14, further comprising providing subsequent portions of the graphical content within the viewing window, wherein providing the subsequent portions halts when the user device has been tilted an angle that corresponds to a first half of the height of the viewing window.

20. The computer-implemented method of claim 14, further comprising:
receiving an indication that a scrolling event has commenced;
providing subsequent portions of the graphical content within the viewing window according to the scrolling event;
receiving an indication that the scrolling event has ceased; and
updating an offset parameter of the viewing window with respect to the graphical content based at least in part on cessation of the scrolling event.

* * * * *